(12) United States Patent
DuPont

(10) Patent No.: US 6,702,233 B1
(45) Date of Patent: Mar. 9, 2004

(54) AIRFOIL ANTI-ICING ASSEMBLY AND METHOD

(75) Inventor: Henry Morgan DuPont, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/778,178

(22) Filed: Feb. 7, 2001

(51) Int. Cl.$^7$ ................................................ B64D 15/04
(52) U.S. Cl. ................................. 244/134 B; 60/39.093
(58) Field of Search .................... 244/134 B, 134 R; 60/39.093

(56) References Cited

U.S. PATENT DOCUMENTS

| | | | |
|---|---|---|---|
| 2,556,736 A | * | 6/1951 | Palmatier |
| 4,603,824 A | * | 8/1986 | McArdel |
| 4,688,745 A | | 8/1987 | Rosenthal Herman A. .. 244/134 |
| 4,738,416 A | * | 4/1988 | Birbragher |
| 4,752,049 A | * | 6/1988 | Cole |
| 4,976,397 A | * | 12/1990 | Rudolph et al. |
| 5,011,098 A | * | 4/1991 | McLaren et al. |
| 5,088,277 A | * | 2/1992 | Schulze |
| 5,873,544 A | | 2/1999 | Pike et al. ........................ 244/1 |
| RE36,215 E | | 6/1999 | Rosenthal .................... 244/134 |
| 6,003,814 A | | 12/1999 | Pike et al. .................... 244/134 |
| 6,079,670 A | * | 6/2000 | Porte |
| 6,119,978 A | * | 9/2000 | Kobayashi et al. |
| 6,131,855 A | * | 10/2000 | Porte |

* cited by examiner

*Primary Examiner*—Tien Dinh
(74) *Attorney, Agent, or Firm*—Goodwin Procter LLP

(57) ABSTRACT

An anti-icing assembly for an airfoil such as an aircraft wing or slat comprises: (a) an airfoil having an exterior surface and interior wall defining an interior cavity, and bottom, middle and side portions all adjacent to the interior cavity; (b) an inlet plenum integral to the airfoil, wherein the inlet plenum comprises (i) an inlet baffle capable of directing hot gases into the airfoil interior cavity and (ii) a throat section interfacing the inlet plenum and airfoil interior cavity; and (c) an outlet plenum integral to the airfoil, wherein the outlet plenum comprises an outlet baffle capable of directing hot gases from the airfoil interior cavity. The airfoil anti-icing method of this invention comprises providing hot gases such as jet engine bleed air to the airfoil assembly of this invention, swirling the hot gases within the airfoil interior cavity, and discharging the hot gases from the airfoil interior cavity through the airfoil outlet end. The system of this invention comprises a source of hot gases, typically jet engine bleed air, and the airfoil assembly of this invention.

20 Claims, 5 Drawing Sheets

BOTTOM EXIT CONFIGURATION

MIDDLE EXIT CONFIGURATION

SIDE EXIT CONFIGURATION

UNSTRUCTURED MESH AIRFOIL MODEL

MODEL NOMENCLATURE

MODEL PHYSICAL PARAMETERS

DEFINITION OF MASS FLOW RATE REGIONS

AIRFOIL ANTI-ICING ASSEMBLY AND METHOD

BACKGROUND OF INVENTION

1. Field of the Invention

This invention relates to an airfoil anti-icing assembly, method and system. More particularly, the assembly, method and system of this invention use hot gases which are directed into the interior cavity of the airfoil and caused to swirl, thereby effecting sufficient heat transfer to avoid icing of the exterior surface of airfoils such as aircraft wings and slats. The hot gases are directed into the airfoil interior cavity without using tubes or spray ducts.

2. Background Information

The use of aircraft jet engine exhaust gases or bleed air in aircraft anti-icing systems to prevent the formation of ice on aircraft wings, engine inlets, etc. is well known to those skilled in the art. For example, co-assigned U.S. Pat. Nos. 4,688,745 and Re. 36,215 disclose a jet engine anti-icing system for preventing jet engine icing, in which hot gas, such as air, is obtained from the jet engine and directed to an annular housing located around the leading edge of the engine housing. Typically, one or more tubes are employed to direct the hot gas flow within the annular duct, as depicted, for example, in FIGS. 3–7 of U.S. Pat. Nos. 4,688,745 and Re. 36,215. The tube or tubes are positioned to discharge hot gases in a direction tangent to the center line of the annular housing, thereby causing the hot gases to entrain air within the housing and swirl within the housing interior. This entrainment and swirl enables the heat transfer to be sufficient to prevent the formation of ice on the housing exterior.

U.S. Pat. Nos. 5,873,544 and 6,003,814 disclose anti-icing conduit systems for the moveable wing slat of an aircraft wing. More particularly, hot compressed bleed air is conducted from the aircraft engine to the interior portion of the moveable wing slat via a conduit system. As shown FIG. 1 of each of U.S. Pat. Nos. 5,873,544 and 6,003,814, the bleed air is introduced into the interior portion of the moveable wing slat via a spray duct or tube having openings therein. The spray duct is supported by an interior wall of the moveable wing slat.

However, the use of such tubes or spray ducts as discussed above to introduce heated gases into the annular regions of jet engines and wings has several disadvantages. First, such tubes and spray ducts require additional materials, and thereby results in attendant additional labor and material costs for the manufacture of systems employing such components. Moreover, as depicted in FIGS. 3–7 of U.S. Pat. Nos. 4,688,745 and Re. 36,215, and FIG. 1 of each of U.S. Pat. Nos. 5,873,544 and 6,003,814, a duct wall of the engine or slat annular region must support the tubes or spray ducts to maintain them in proper position within the duct, thereby adding additional load to the duct wall.

In view of the foregoing, it would be useful to have an assembly, method and system for preventing icing in airfoils such as aircraft slats and wings which avoided the use of tubes or spray ducts to provide heated gases to the corresponding conduit or duct portions of the airfoil. It is one object of this invention to provide an assembly for anti-icing systems for airfoils which does not employ such tubes or spray ducts. It is one feature of the assembly of this invention that hot gases such as engine bleed air are introduced into a conduit or duct portion of an airfoil such as an aircraft slat or wing without using tubes or spray ducts. Instead, the hot gases are introduced via a simple inlet conduit. The assembly of this invention achieves the necessary swirl of the hot gases required for effective heat transfer yet, advantageously avoids the additional materials required for such tubes or spray ducts, as well as the attendant additional labor and material costs associated therewith.

It is another object of this invention to provide a method for preventing icing of airfoils which employs the assembly of this invention. It is another object of this invention to provide an anti-icing system for airfoils which employ the assembly of this invention. Additional objects, features and advantages of this invention will be apparent to those skilled in the art from the detailed description of the invention set forth herewith.

SUMMARY OF THE INVENTION

The airfoil anti-icing assembly of this invention comprises:

(a) an airfoil having an exterior surface and interior wall defining an interior cavity, and bottom, middle and side portions all adjacent to the interior cavity;

(b) an inlet plenum integral to the airfoil, wherein the inlet plenum comprises (i) an inlet baffle capable of directing hot gases into the airfoil interior cavity and (ii) a throat section interfacing the inlet plenum and airfoil interior cavity; and (c) an outlet plenum integral to the airfoil, wherein the outlet plenum comprises an outlet baffle capable of directing hot gases from the airfoil interior cavity.

The airfoil anti-icing method of this invention comprises providing hot gases such as jet engine bleed air to the airfoil assembly of this invention, swirling the hot gases within the airfoil interior cavity, and discharging the hot gases from the airfoil interior cavity through the airfoil outlet end. The system of this invention comprises a source of hot gases, typically jet engine bleed air, and the airfoil assembly of this invention.

DETAILED DESCRIPTION OF THE INVENTION

Figure 1:
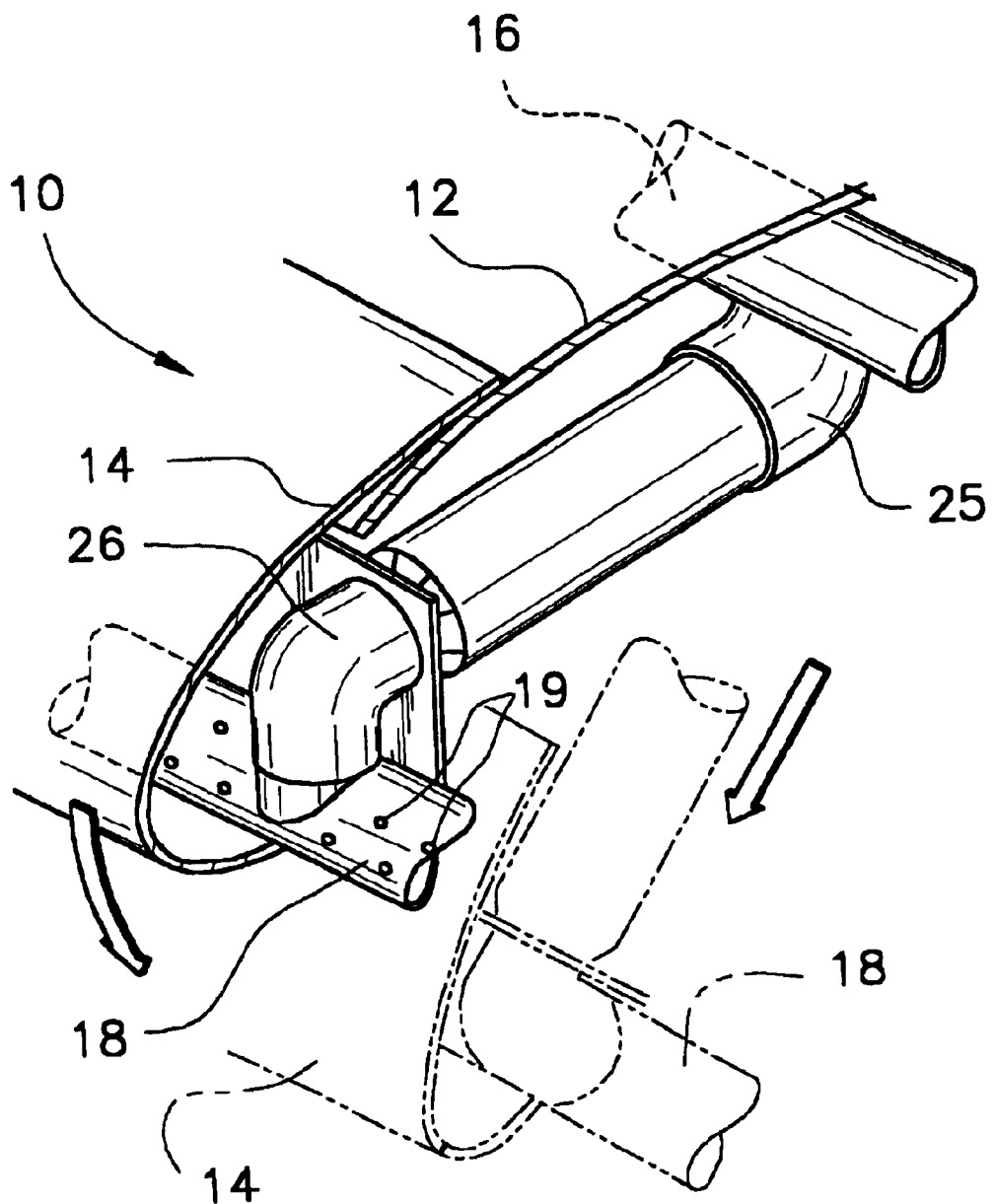
FIG. 1 is a simplified, cross-sectional view of the leading edge of an aircraft wing having a moveable slat and a slidable duct assembly interconnected to a spray duct, as disclosed in U.S. Pat. No. 5,873,544. The view shows the slat retracted and, by a broken line, the slat extended.

FIG. 1 depicts the prior art aircraft anti-icing conduit system disclosed in U.S. Pat. No. 5,873,544 by means of a cross-sectional view of a portion of a leading edge 10 of an airplane wing. Shown is a fixed wing portion 12 and a moveable wing slat 14. The wing slat 14 is normally retracted to nest against the wing's leading edge when in high-altitude flight and is deployed by a suitable actuator (not shown) into the illustrated broken-line position for takeoffs and landings. Hot, compressed bleed air is conducted from the aircraft engine (not shown) to a suitable transfer point on the wing's leading edge. From the supply duct 16, the bleed air is conducted to a spray duct 18 running lengthwise in the wing slat 14. Transitional joints 25 and 26 enable the bleed air to be conveyed from supply duct 16 to spray duct 18. Openings 19 deliver the bleed air to the interior surface of the wing slat 14.

Figure 2:
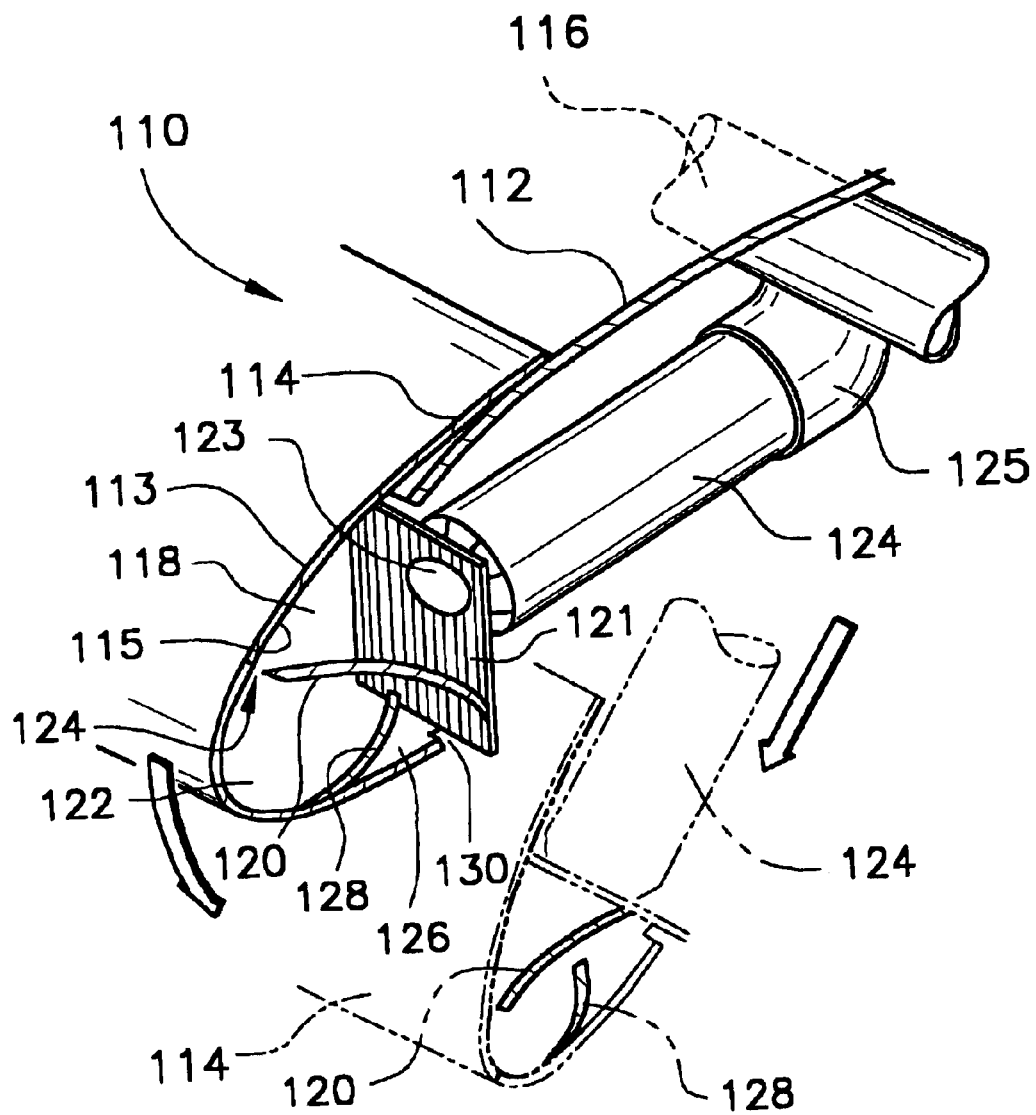
FIG. 2 is a simplified, cross-sectional view of one embodiment of this invention, in which the leading edge of an aircraft wing having a moveable slat and a slidable duct assembly is interconnected to an inlet plenum which is integral to the slat.

In contrast, FIG. 2 depicts an embodiment of the airfoil anti-icing assembly of this invention, by means of a cross-sectional view of a leading edge 110 of an airplane wing. Shown is a fixed wing portion 112 and a moveable wing slat 114 having an exterior surface 113 and interior wall 115 defining interior cavity 122. The wing slat 114 is normally retracted to nest against the wing's leading edge when in high-altitude flight and is deployed by a suitable actuator (not shown) into the illustrated broken-line position for takeoffs and landings. Hot, compressed bleed air is conducted from the aircraft engine (not shown) to a suitable transfer point on the wing's leading edge. The wing slat bleed air is conducted by means of supply duct 116, transitional joint 125, conduit 124 and conduit exit 123 located in plenum wall 121 to an inlet plenum 118 integral to the slat 114. The inlet plenum 118 contains an inlet baffle 120 which directs the bleed air into the slat interior cavity 122. A throat section 124 interfaces the inlet baffle 120 and slat interior cavity 122. Integral to the slat 114 is also an outlet plenum 126 having an outlet baffle 128, which directs hot gases from the airfoil interior cavity 122. In this embodiment, the hot gases exit airfoil interior cavity 122 via exit slot 130.

Figure 3:
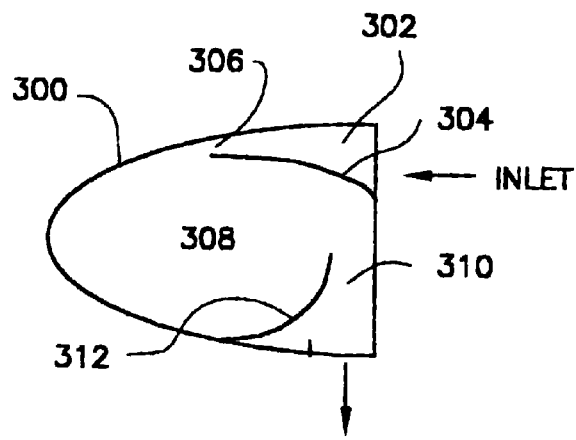
FIG. 3 is a simplified, cross-sectional view of an embodiment of this invention, in which the outlet plenum is located at the bottom portion of the airfoil.

FIG. 3 depicts another embodiment of this invention in simplified form. In FIG. 3, the airfoil 300 has an inlet plenum 302 and inlet baffle 304, with throat 306 interfacing the inlet plenum 302 and airfoil interior cavity 308. In the embodiment of FIG. 3, an outlet plenum 310 and outlet baffle 312 enable hot gases to be directed from the airfoil interior cavity 308 by positioning the outlet plenum at the bottom portion of the airfoil.

Figure 4:
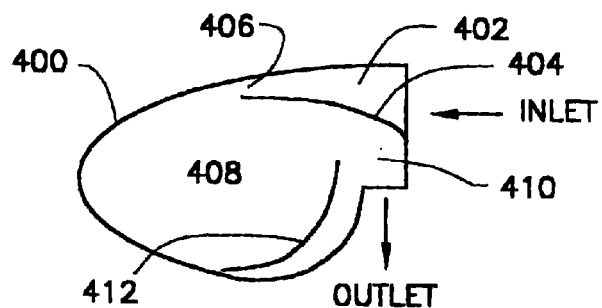
FIG. 4 is a simplified, cross-sectional view of an embodiment of this invention, in which the outlet plenum is located at the middle portion of the airfoil.

FIG. 4 depicts another embodiment of this invention in simplified form. In FIG. 4, the airfoil 400 has an inlet plenum 402 and inlet baffle 404, with throat 406 interfacing the inlet plenum 402 and airfoil interior cavity 408. In the embodiment of FIG. 4, an outlet plenum 410 and outlet baffle 412 enable hot gases to be directed from the airfoil interior cavity 408 by positioning the outlet plenum at the middle portion of the airfoil.

Figure 5:
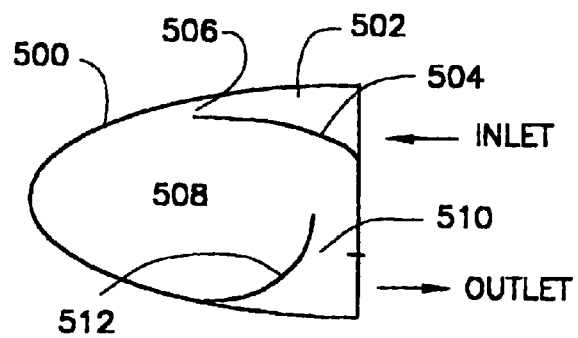
FIG. 5 is a simplified, cross-sectional view of an embodiment of this invention, in which the outlet plenum is located at the side portion of the airfoil.

FIG. 5 depicts another embodiment of this invention in simplified form. In FIG. 5, the airfoil 500 has an inlet plenum 502 and inlet baffle 504, with throat 506 interfacing the inlet plenum 502 and airfoil interior cavity 508. In the embodiment of FIG. 5, an outlet plenum 510 and outlet baffle 512 enable hot gases to be directed from the airfoil interior cavity 508 by positioning the outlet plenum at the side portion of the airfoil.

In various preferred embodiments of this invention the hot gases enter the airfoil interior cavity via the inlet plenum as a wall jet. As used herein, the term "wall jet" refers to a stream of fluid (e.g. engine bleed air) ejected from an orifice parallel to and in contact with a solid surface (e.g. a wall). In addition, in various preferred embodiments of this invention the throat section of the inlet plenum is slot-shaped.

This invention is further illustrated by the following example, which is not meant to limit the invention in any way.

Example 1

A computer modeling analysis of the invention was conducted using a computational grid generator (i.e. GAMBIT, a product of FLUENT, Inc., Lebanon, N.H.) and a two-dimensional (2-D) Navier-Stokes flow solver program (i.e. FLUENT, a product of FLUENT, Inc., Lebanon, N.H.).

Figure 6:
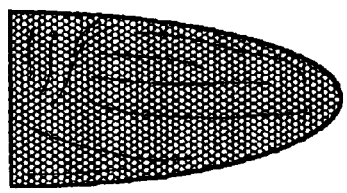
FIG. 6 is a cross-sectional depiction of an airfoil model typical unstructured mesh using the GAMBIT computational grid generator.

The computational model was created using an unstructured, triangular mesh. The airfoil model is a 2-D cross-section of a leading-edge using NACA airfoil coordinates. This mesh was created using the grid generator GAMBIT. More detailed information about this grid generator is included in the GAMBIT User's Guide (FLUENT, Inc., Lebanon, N.H., May 1998). FIG. 6 displays a typical example of an unstructured mesh in an airfoil model generated in GAMBIT. These models used an average of 3000 nodes to define the grid.

Figure 7:
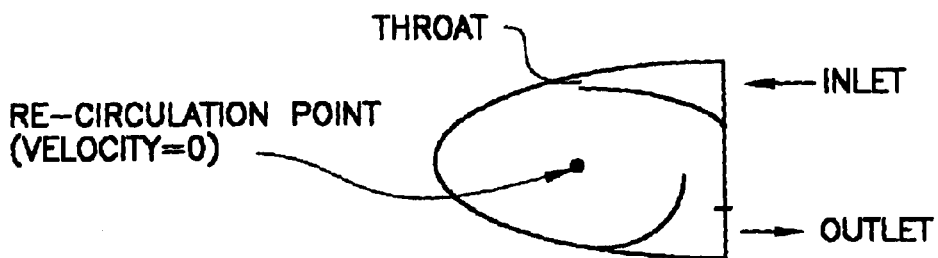
FIG. 7 is a cross-sectional depiction of an airfoil and the model nomenclature used in the computational model of Example 1.

Each airfoil model contained an inlet, outlet, and throat section. For consistency between all of the models, the ratio of outlet area to throat area used was set at a constant value of 6:1, while the ratio of the inlet area to throat area was set to 8:1. There was also a region in each model where the velocity was approximately equal to zero. That area was defined as the re-circulation point. This location was used to calculate the swirl factor for the solution. FIG. 7 describes the computational model nomenclature used.

Figure 8:
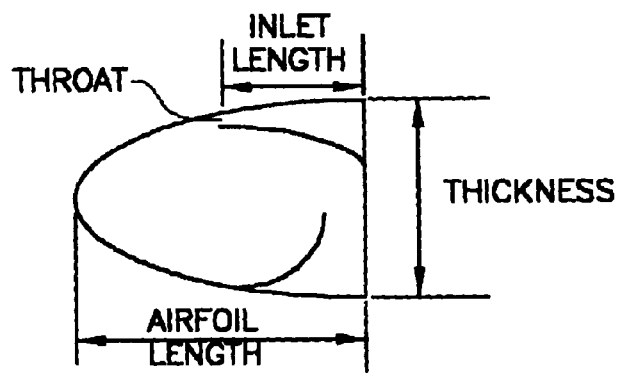
FIG. 8 is a cross-sectional depiction of an airfoil and the physical property parameters used in the computational model of Example 1.

Several models were created to determine the flow properties associated with changes in the physical properties of the airfoil. The inlet length, model length and model thickness were varied to obtain several different models. These physical properties are defined in FIG. 8.

The airfoil coordinates used were taken from the leading edges of the 0008, 0012, and 0024 NACA airfoil families. These coordinates were found in I. H. Abbott and A. E. Von Doenhoff, *Theory of Wing Sections* (Dover Publications, Inc. 1959).

The final variable in the models was the location of the exit or pressure outlets. The following figures display the difference in exit configurations. FIGS. 3, 4 and 5 show the differences between the bottom, middle, and side exit configurations, respectively.

The method for naming each configuration was defined by the airfoil characteristics, inlet length, and the pressure exit configuration. For example, the "0008_15_middle" configuration used the NACA 0008 leading edge airfoil coordinates with an inlet length of 0.15 ft and a middle exit configuration. There were 27 different models created.

The CFD computer code used to calculate the flow solution was Fluent 5.0. The code is described in the FLUENT 5.0 User's Guide, Vols. 1–4 (Fluent, Inc., Lebanon, N.H. July 1998). A coupled solver was used with explicit equation formulation. The turbulence model used for the airfoil models was the two equation, renormalization group (RNG), k-epsilon turbulence model with standard wall functions. The k-epsilon model is a typical choice for viscous modeling.

The models were all tested at the same boundary conditions. The inlet and exit boundary conditions used on the configurations were kept constant throughout the study. The inlet condition was chosen so that the flow would be choked at the throat of the model. The condition used was a pressure inlet boundary condition which was set to 60 psia for total pressure and a static pressure of 31 psia. The total temperature inlet condition used was 350° F., typical of precooler flow temperatures. The exit conditions were chosen to represent typical ambient conditions, such as a total temperature of 59° F. and a total pressure of 14.7 psia. For the viscous boundary conditions, the intensity and viscosity ratios were set to 10% inlet and backflow turbulent intensity and 10% inlet and backflow turbulent viscosity ratio. Although a turbulence length or hydraulic diameter could have been used to set the viscosity term, a percentage of viscosity was chosen for consistency between the models.

Figure 9:
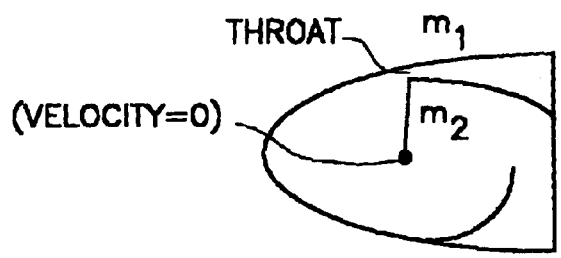
FIG. 9 is a cross-sectional depiction of an airfoil and the mass flow rate regions used in the computational model of Example 1.

For comparison purposes a swirl factor was calculated for each of the 27 different configurations. The swirl factor was calculated using the following equation:

$$\text{Swirl Factor (S.F.)} = \frac{m_2}{m_1} - 1$$

where the subscript 1 denoted the area defined as the throat, and the subscript 2 was used to define the distance from the bottom edge of the throat region to the re-circulation point. These areas are shown in FIG. 9.

From the FLUENT program solutions these mass flow rates were calculated to determine the swirl factor. In a preferred embodiment, the assembly of this invention has a swirl factor ranging from about 0.1 to about 3.5.

A comparison of how the swirl factor changed with changing hydraulic diameter was examined. The hydraulic diameter was calculated by the following equation:

Hydraulic Diameter=4×Area/Perimeter where the area is defined as the complete area in the model, and the perimeter is defined as the wetted area of the model which includes the inlet, outlet, and outlining of the model.

For each solution the swirl factor, physical properties, and hydraulic diameters were determined. Table 1 displays the values calculated for each of the 27 models created.

TABLE 1

| Model Name | Inlet length (ft) | Model Length (ft) | Model Thickness (ft) | Hydraulic Diameter (4* Area/perimeter) | Swirl Factor |
|---|---|---|---|---|---|
| 0008_05_bottom | 0.05 | 0.2 | 0.0765 | 0.0636 | 0.13 |
| 0008_05_middle | 0.05 | 0.2 | 0.0724 | 0.0678 | 0.31 |
| 0008_05_side | 0.05 | 0.2 | 0.0765 | 0.0636 | 0.24 |
| 0008_10_bottom | 0.1 | 0.2 | 0.0765 | 0.0565 | 0.11 |
| 0008_10_middle | 0.1 | 0.2 | 0.0724 | 0.0586 | 0.12 |
| 0008_10_side | 0.1 | 0.2 | 0.0765 | 0.0565 | 0.32 |
| 0008_125_bottom | 0.125 | 0.2 | 0.0765 | 0.0533 | 0.23 |
| 0008_125_middle | 0.125 | 0.2 | 0.0724 | 0.0547 | 0.24 |
| 0008_125_side | 0.125 | 0.2 | 0.0765 | 0.0533 | 0.27 |
| 0012_10_bottom | 0.1 | 0.3 | 0.120 | 0.0997 | 0.94 |
| 0012_10_middle | 0.1 | 0.3 | 0.117 | 0.112 | 0.91 |
| 0012_10_side | 0.1 | 0.3 | 0.120 | 0.0997 | 1.56 |
| 0012_15_bottom | 0.15 | 0.3 | 0.120 | 0.0924 | 0.71 |
| 0012_15_middle | 0.15 | 0.3 | 0.117 | 0.102 | 0.79 |
| 0012_15_side | 0.15 | 0.3 | 0.120 | 0.0924 | 1.04 |
| 0012_20_bottom | 0.2 | 0.3 | 0.120 | 0.0857 | 0.55 |
| 0012_20_middle | 0.2 | 0.3 | 0.117 | 0.0928 | 0.60 |
| 0012_20_side | 0.2 | 0.3 | 0.120 | 0.0879 | 0.62 |
| 0024_10_bottom | 0.1 | 0.3 | 0.240 | 0.154 | 3.42 |
| 0024_10_middle | 0.1 | 0.3 | 0.227 | 0.187 | 2.93 |
| 0024_10_side | 0.1 | 0.3 | 0.240 | 0.154 | 2.93 |
| 0024_15_bottom | 0.15 | 0.3 | 0.240 | 0.145 | 3.21 |
| 0024_15_middle | 0.15 | 0.3 | 0.227 | 0.172 | 3.27 |
| 0024_15_side | 0.15 | 0.3 | 0.240 | 0.145 | 2.97 |
| 0024_20_bottom | 0.2 | 0.3 | 0.240 | 0.136 | 2.51 |
| 0024_20_middle | 0.2 | 0.3 | 0.227 | 0.159 | 2.67 |
| 0024_20_side | 0.2 | 0.3 | 0.240 | 0.136 | 2.96 |

From the swirl factor values obtained, it was concluded that the injected air was being recirculated within the models. The data indicated that an increase in hydraulic diameter also increased the swirl factor value. This trend is visible in FIG. 10, which is a plot of swirl factor values versus hydraulic diameter. In the NACA 0024 airfoil cases, the swirl factor value was above 2.5, which is indicative of good re-circulation of the flow. Accordingly, it was concluded that this invention is capable of generating sufficient swirl factor values, and is a technically viable alternative to the piccolo tube or other anti-icing systems available in the prior art.

Figure 10:
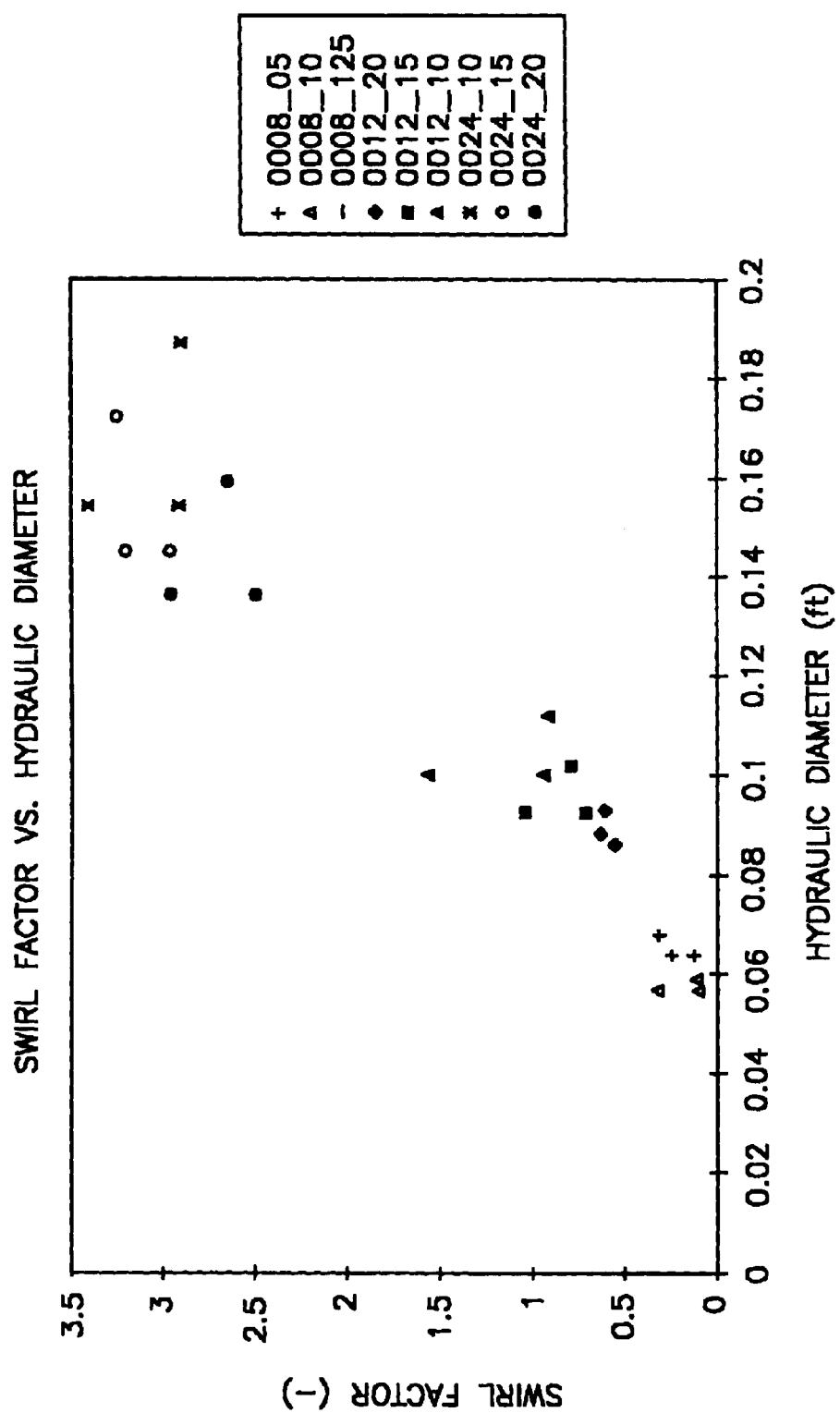
FIG. 10 is a plot of Swirl Factor vs. Hydraulic Diameter values obtained via the computational model of Example 1.

Also in FIG. 10, it was shown that for each configuration there appeared to be no significant difference in the swirl factor values depending on what type of exit configuration was used. There are three computational data points for each model: one for the bottom, one for the side and one for the middle configuration. As shown in FIG. 10, the relationship between swirl factor (SW) and hydraulic diameter (HD) may be expressed as follows. For the bottom configuration the relationship is:

$SW = 306.24(HD)^2 - 29.252(HD) + 0.8193.$

For the middle configuration the relationship is:

$SW = 96.883(HD)^2 + 1.3459(HD) - 0.2603.$

For the side configuration the relationship is:

$SW = 88.565(HD)^2 + 12.496(HD) - 0.7784.$

In preferred embodiments of this invention, these relationships are satisfied.

It was also concluded that the FLUENT program was capable of computing a solution for this type of configuration. The code was able to solve the flow problem with convergence values that ranged from $2 \times 10^{-3}$ to $1 \times 10^{-2}$. Although the residuals did not drop three orders of magnitude, which is the typical measurement for a converged solution, the residual values remained generally constant after 800 iterations. The FLUENT program was capable of analyzing the flow, calculating mass flow rates and determining other flow and thermal properties.

Although the above-described modeling demonstrated the advantages of the invention, additional modeling would be helpful. For example, further evaluation of the models with swirl factor values greater than 2.5 should be examined. These models should be computationally tested with both internal and external flows. This would be beneficial in determining convective heat transfer coefficients for the systems. Additionally it would be useful to determine the typical sizes of the systems currently in use with the piccolo tubes. This includes using realistic measurements for the wing shape and bulkhead locations. This is an important factor since the size of the model played an important part in the swirl factor value.

Also, for more accurate flow modeling, some three-dimensional (3-D) calculations would be helpful. Although the 2-D computational solutions displayed some promising results, there are limitations to the accuracy of a 2-D computational model. Accordingly, further 3-D analyses for more accurate modeling of the flow and thermal property inquiry would be valuable to confirm the results obtained. These would be important factors to be used in comparison to the piccolo tubes and the like used in current aircraft. Although the FLUENT program has been shown in the past to be capable of handling large models and complex flow fields, it has not yet been demonstrated that FLUENT is capable of handling a 3-D model of this complexity.

Without wishing to be bound by any one theory, it is believed that in the present invention the hot gases are introduced into the airfoil at total pressure via the inlet plenum, and the hot gases are removed or exit via the outlet plenum at static pressure. The pressure differential between the inlet and outlet plenums results in the velocity-induced swirl factor previously described.

It should be understood that various changes and modifications to the preferred embodiments described herein will be apparent to those skilled in the art. Such changes and modifications can be made without departing from the spirit and scope of this invention and without diminishing its attendant advantages. It is therefore intended that such changes and modifications be covered by the appended claims.

I claim:

1. An anti-icing assembly for an aircraft wing or wing slat comprising:
   (a) an aircraft wing or wing slat having an exterior surface, an interior surface and a plenum wall defining an interior cavity, and bottom, middle and side portions all adjacent to the interior cavity;
   (b) an inlet plenum integral to the aircraft wing or wing slat, wherein the inlet plenum comprises (i) an inlet baffle capable of directing hot gases into the interior cavity and (ii) a throat section interfacing the inlet plenum and interior cavity; said plenum wall is located adjacent to said inlet plenum and
   (c) an outlet plenum integral to the aircraft wing or wing slat, wherein the outlet plenum is located within the same interior cavity as the inlet plenum, and the outlet plenum comprises an outlet baffle capable of directing hot gases from the interior cavity through an outlet end away from the wing or wing slat.

2. The assembly of claim 1, in which the hot gases swirl within the airfoil interior cavity.

3. The assembly of claim 1, in which the hot gases entering the airfoil interior cavity from the inlet plenum form a wall jet.

4. The assembly of claim 1, in which the outlet plenum is located at the bottom portion of the airfoil.

5. The assembly of claim 1, in which the outlet plenum is located at the side portion of the airfoil.

6. The assembly of claim 1, in which the outlet plenum is located at the middle portion of the airfoil.

7. The assembly of claim 1, in which the throat section of the inlet plenum is slot-shaped.

8. The assembly of claim 1, in which the hot gases are obtained from jet engine bleed air.

9. An aircraft wing or wing slat anti-icing method comprising:
   (a) providing an, assembly comprising: (i) an aircraft wing or wing slat having an exterior surface, an interior surface and a plenum wall defining an interior cavity, and bottom, middle and side portions all adjacent to the interior cavity; (ii) an inlet plenum integral to the aircraft wing or wing slat, wherein the inlet plenum comprises an inlet baffle capable of directing hot gases into the interior cavity and a throat section interfacing the inlet plenum and interior cavity; said plenum wall is located adjacent to said inlet plenum and (iii) an outlet plenum integral to the aircraft wing or wing slat, wherein the outlet plenum is located within the same interior cavity as the inlet plenum, and tile outlet plenum comprises an outlet baffle capable of directing hot gases from the interior cavity through an outlet end cavity from the wing or wing slat;
   (b) introducing hot gases into the inlet plenum; and
   (c) discharging the hot gases from the interior cavity through the outlet and away from the wing or wing slat.

10. The method of claim 9, in which the hot gases swirl within the airfoil interior cavity.

11. The method of claim 10, In which the hot gases entering the airfoil interior cavity from the inlet plenum form a wall jet.

12. The method of claim 9, in which the outlet plenum is located at the bottom portion of the airfoil.

13. The method of claim 9, in which the outlet plenum is located at the side portion of the airfoil.

14. The method of claim 9, in which the outlet plenum is located at the middle portion of the airfoil.

15. The method of claim 9, in which the throat section of the inlet plenum is slot-shaped.

16. The method of claim 8, in which the hot gases are obtained from jet engine bleed air.

17. An anti-icing system for an aircraft wing or wing slat, the system comprising:
   (a) a source of hot gases;
   (b) an aircraft wing or wing slat having an exterior surface, an interior surface and a plenum wall defining an interior cavity, and bottom, middle and side portions all adjacent to the interior cavity;
   (c) an inlet plenum integral to the aircraft wing or wing slat, wherein the inlet plenum comprises (i) an inlet baffle capable of directing hot gases into the interior cavity and (ii) a throat section interfacing the inlet plenum and interior cavity; said plenum wall is located adjacent to said inlet plenum and
   (d) an outlet plenum integral to the aircraft wing or wing slat, wherein the outlet plenum is located within the same interior cavity as the inlet plenum, and the outlet plenum comprises an outlet baffle capable of directing hot gases from the interior cavity through a end away from the wing or wing salt.

18. An anti-icing assembly for an aircraft wing or wing slat comprising:
   (a) an aircraft wing or wing slat having an exterior surface, an interior surface and a plenum wall defining an interior cavity, and bottom, middle and side portions all adjacent to the interior cavity;

(b) an inlet plenum integral to the aircraft wing or wing slat, wherein the inlet plenum comprises (i) an inlet baffle capable of directing hot gases into the interior cavity such that the hot gases swirl within the interior cavity with a swirl factor ranging from about 0.1 to about 3.5 arid (ii) a throat section interfacing the inlet plenum and interior cavity; said plenum wall is located adjacent to said inlet plenum and (c) an outlet plenum integral to the aircraft wing or wing slat, wherein the outlet plenum is located within the same interior cavity as the inlet plenum, and the outlet plenum comprises an outlet baffle capable of directing hot gases from the interior cavity through an outlet end away from the wing or wing slat.

19. An aircraft wing or wing slat anti-icing method comprising:

(a) providing an assembly comprising: (i) an aircraft wing or wing slat having an exterior surface, an interior surface and a plenum wall defining an interior cavity, and bottom, middle and side portions all adjacent to the interior cavity; (ii) an inlet plenum integral to the aircraft wing or wing slat, wherein the inlet plenum comprises an inlet baffle capable of directing hot gases into the interior cavity such that the hot vases swirl within the interior cavity with a swirl factor ranging from about 0.1 to about 3.5 and a throat section interfacing the inlet plenum and interior cavity; said plenum wall is located adjacent to said inlet plenum and (iii) an outlet plenum integral to the aircraft wing or wing slat, wherein the outlet plenum is located within the same interior cavity as the inlet plenum, and the outlet plenum comprises an outlet baffle capable of directing hot gases from the interior cavity through an outlet end away from the wing or wing slat;

(b) introducing hot gases into the inlet plenum; and (c) discharging the hot gases from the interior cavity through the outlet end away from the wing or wing slat.

20. An anti-icing system for an aircraft wing or wing slat, the system comprising:

(a) a source of hot gases;

(b) an aircraft wing or wing slat having an exterior surface, an interior surface and a plenum wall defining an interior cavity, and bottom, middle and side portions all adjacent to the interior cavity;

(c) an inlet plenum integral to the aircraft wing or wing slat, wherein the inlet plenum comprises (i) an inlet baffle capable of directing hot gases into the interior cavity such that the hot gases swirl within the interior cavity with a swirl factor ranging from about 0.1 to about 3.5 and (ii) a throat section interfacing the inlet plenum and interior cavity; said plenum wall is located adjacent to said inlet plenum and (d) an outlet plenum integral to the aircraft wing or wing slat, wherein the outlet plenum is located within the same interior cavity as the inlet plenum, and the outlet plenum comprises an outlet baffle capable of directing hot gases from the interior cavity through an outlet end away from the wing or wing slat.

* * * * *

UNITED STATES PATENT AND TRADEMARK OFFICE
CERTIFICATE OF CORRECTION

PATENT NO. : 6,702,233 B1  
APPLICATION NO. : 09/778178  
DATED : March 9, 2004  
INVENTOR(S) : Henry Morgan DuPont Page 1 of 1

It is certified that error appears in the above-identified patent and that said Letters Patent is hereby corrected as shown below:

Column 8, line 9, "an," should read --an--;

Column 8, line 21, "tile" should read --the--;

Column 8, line 27, "and" should read --end--;

Column 8, line 60, "a" should read --an outlet--;

Column 8, line 61, "salt" should read --slat--;

Column 9, line 24, "vases" should read --gases--.

Signed and Sealed this

Twenty-fifth Day of December, 2007

JON W. DUDAS  
*Director of the United States Patent and Trademark Office*